United States Patent
Fairbanks

[15] 3,654,031
[45] Apr. 4, 1972

[54] APPARATUS FOR MAKING EXTRUDED NETS HAVING INTEGRAL STAND JUNCTIONS

[72] Inventor: Theodore H. Fairbanks, Liverpool, Pa.
[73] Assignee: FMC Corporation, Philadelphia, Pa.
[22] Filed: Oct. 29, 1969
[21] Appl. No.: 872,089

[52] U.S. Cl. .............................. 156/441, 18/12 N, 156/167
[51] Int. Cl. ......................................................... D04h 3/16
[58] Field of Search ........................ 156/441, 167; 18/12 N

[56] References Cited

UNITED STATES PATENTS

| | | |
|---|---|---|
| 3,029,174 | 4/1962 | Schultheiss ............................. 156/167 |
| 3,234,071 | 2/1966 | Ward et al. ........................ 156/167 X |
| 3,538,545 | 11/1970 | Smith ..................................... 18/12 N |
| 3,227,184 | 1/1966 | Anderson et al. .................. 156/167 X |
| 3,123,512 | 3/1964 | Mercer ............................. 156/167 X |
| 3,433,857 | 3/1969 | Dutton et al. ..................... 156/167 X |

Primary Examiner—Benjamin A. Borchelt
Assistant Examiner—G. E. Montone
Attorney—Thomas R. O'Malley, George F. Mueller and Eugene G. Horsky

[57] ABSTRACT

An apparatus for making an extruded net-like structure having intersecting mesh strands in which at least portions of certain mesh strands pass directly through other mesh strands at their locations of intersection and are bonded thereat.

5 Claims, 8 Drawing Figures

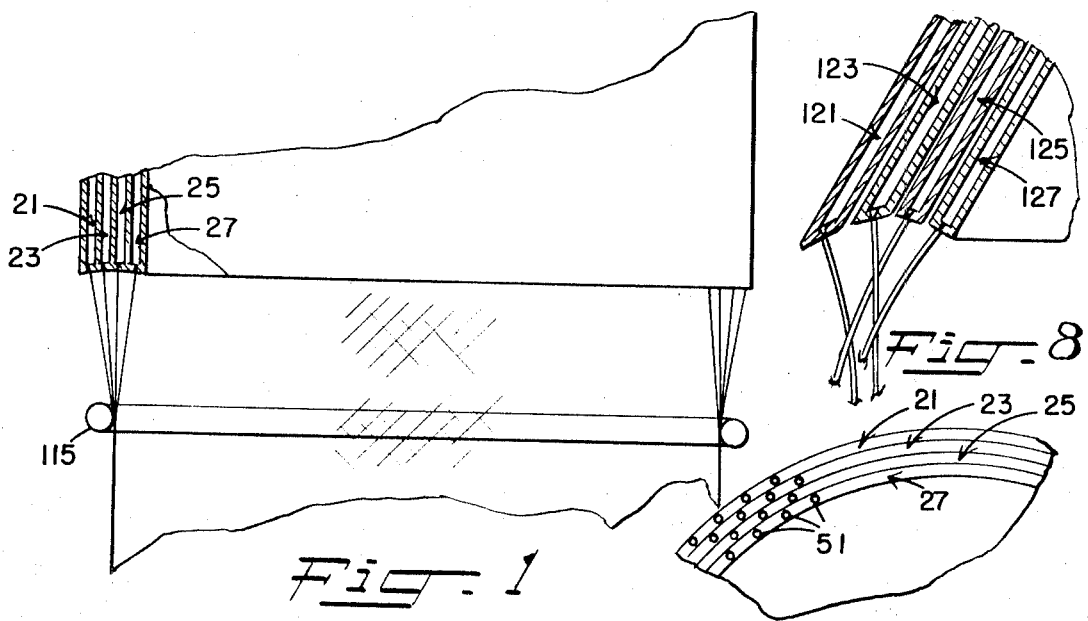
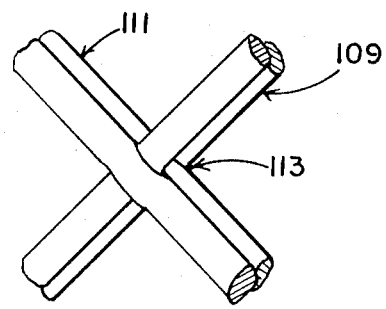
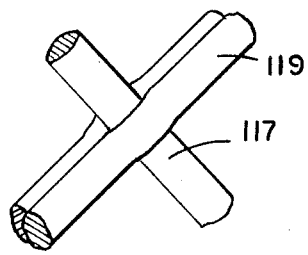
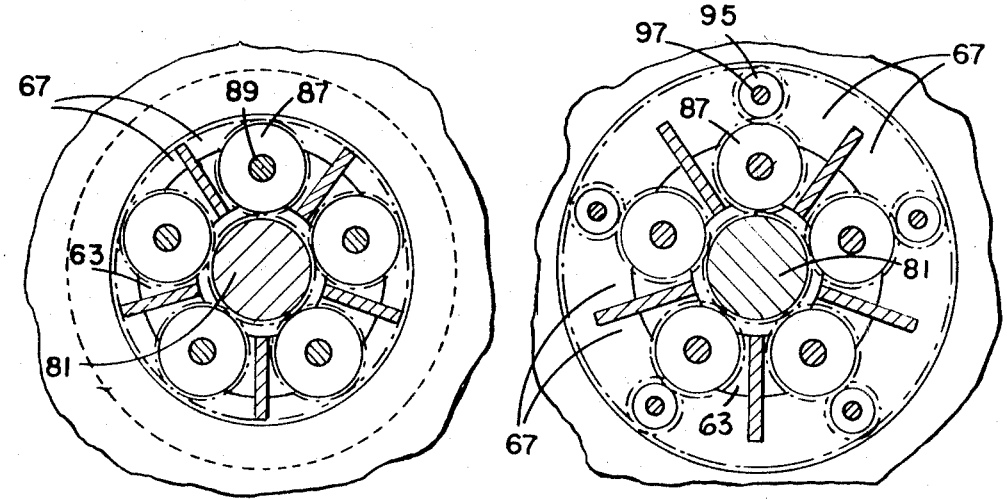

APPARATUS FOR MAKING EXTRUDED NETS HAVING INTEGRAL STAND JUNCTIONS

The present invention relates to an apparatus for making improved net-like structures or fabrics.

U.S. Pat. No. 2,919,467 is directed to the manufacture of net-like structures in which mesh intersecting portions are each composed of an integrally extruded plastic mass and mesh strand-forming portions are formed as divisions of such intersection-forming portions, with the whole fabric or structure being an integral entity. The process and apparatus described in this patent does facilitate continuous production of satisfactory net-like structures but at a very slow rate and, therefore, involves high operating costs.

While other known processes and apparatus may provide for more economical production of net-like structures, the structures produced are, in general, lacking in desired physical properties. For example, one of the fastest processes for making net-like structures is to extrude a series of diagonally crossing strands which are subsequently bonded at their crossing points under heat and pressure. In such structures, however, the bonded strand intersections lack desired strength and are generally weaker than the unitary intersections present in net-like structures formed by the process described in the above-noted patent. Accordingly, a primary object of this invention is to provide a generally new or improved and more satisfactory apparatus for making a net-like structure or fabric.

Another object is the provision of an apparatus for making a net-like structure having strands and integral strand junctions at which at least portions of one strand passes through another strand.

Still another object is to provide an improved extrusion apparatus for making net-like structures having strands and integral strand intersections or junctions.

A further object is the provision of an improved and apparatus for making multi-layer net-like structures by extrusion in which at least portions of certain strands pass through other strands and are bonded thereat to form integral junctions.

These and other objects are accomplished in accordance with the present invention by an apparatus from which streams of flowable strand-forming material are continuously extruded at spaced intervals along each of at least three parallel lines, which are either straight or circular, with the streams along alternate of such lines being aligned and brought into contact with each other at a location below their points of extrusion. Relative movement is provided between the streams in adjacent lines, at their points of extrusion, with the streams in the alternate of such lines maintaining their aligned relationship. The alternate streams which are moved are moved in unison; that is, in the same direction and at the same rate of speed, along their respective parallel lines so as to maintain their aligned relationship throughout. Concomitantly with such movement, all of the extruded streams are continuously advanced in a direction away from their points of extrusion.

The streams which are moved along their respective lines of extrusion as described above assume paths which are inclined relative to the paths of streams which are extruded along adjacent lines. The aligned streams which are extruded along alternate lines will contact with each other, except at locations at which such streams intersect and contact with streams which are extruded along lines between such alternate lines. Thereafter, all of the streams of strand-forming material are set into strands to provide integral net-like structures.

Relative movement between streams extruded along adjacent lines may be achieved by moving the streams along one or both of such lines. If the streams along both of such lines are moved, the streams along one line may be moved in the same direction but at a different speed than the streams which are extruded along an adjacent line or in a direction opposite to the streams in such adjacent lines.

If in the operation of the apparatus of the present invention streams are extruded at spaced intervals along each of only three lines the streams which are extruded along the alternate lines and which are aligned with each other will contact, except at locations at which such streams intersect with streams which are extruded along the middle of such three lines. Each pair of aligned and contacting streams, when set, will appear as a composite, unitary strand in the finished net-like structure. The streams which were originally extruded along the middle of the three lines will appear as individual strands which pass through and are bonded to such composite strands.

As a further example of the operation of the apparatus of the present invention, streams may be extruded at spaced intervals along each of only four lines. In this instance there will be, of course, two pairs of alternate lines and the aligned streams in each such pair will contact with each other, except at the locations at which such streams intersect with the streams which are extruded along adjacent of such lines. Each pair of aligned and contacting streams, when set, will appear as a composite unitary strand, with one half of each of such strands passing through and being bonded to each composite strand with which it crosses.

More specifically, the apparatus for carrying out the method of the present invention includes means having orifices for extruding a plurality of streams of flowable strand-forming material at spaced intervals along each of at least three lines, which may be straight or circular. The orifices in these means are oriented so that the streams extruded along each such line are aligned with streams in alternate lines. Means are included for providing relative movement between orifices located along adjacent of such lines, with the orifices along alternate lines moving in unison. Included also are means for advancing all of the extruded streams in a direction away from the extrusion means and for setting of such streams.

More specifically, the extruding means may include a single extrusion chamber having a bottom wall defined by at least three elongated die members which are disposed in side-by-side relationship. Each of such members is formed with orifices, with the orifices in alternate die members being aligned with each other. Such apparatus would include means for providing relative movement between the adjacent die members.

An alternative, and preferred arrangement which is hereafter described in detail, includes at least three die members of annular or conical configuration, each of which has a chamber defined by a circular end wall having orifices therein and a pair of spaced side walls. These die members are nested or stacked in spaced-apart relationship along a common axis, with the end walls thereof located adjacent to each other. The orifices in alternate of such die members are maintained radially aligned with each other and at least certain of the die members are rotated about the common axis to provide for relative movement between adjacent of such members.

Streams of flowable strand-forming material extruded from orifices in alternate of the die members are brought into or are encouraged to contact with each other along their lengths by suitable deflecting means, such as rings or mandrels over or through which travel the extruded streams, or by having the axes of such aligned orifices inclined to direct the streams issuing therefrom along converging paths. Using this latter arrangement with elongated die members, the axes of the orifices in alternate of such members would lie in planes which intersect with each other at an acute angle. In an apparatus employing die members of annular or conical configuration, parallel lines drawn through the axis of orifices in different die members will be in planes which intersect each other at an acute angle.

The orifices in the individual die-carrying members preferably are but need not be of like size and/or shape and may differ from those in the other die-carrying members with which they are aligned. Moreover, the flowable strand-forming material delivered to the individual die-carrying members may differ in composition and/or pigmentation to impart different properties as for example, color or texture to the intersecting strands of the resulting net-like structures. While streams must be extruded along at least three lines, the maximum number of such parallel lines along which streams may be extruded will be limited by the particular construction of apparatus employed and the ability to properly set the extruded streams.

The teachings of the present invention are applicable for use with a variety of materials, which are referred to by the term "plastic," including materials which are thermoplastic, such as polyamides or superpolyamides, polyesters, polyvinyl chloride, copolymers thereof, polyolefins, cellulose acetates, etc., natural or synthetic rubbers, thermosetting materials or wet-spinnable materials, such as viscose, cupro-ammonium cellulosic, or carboxymethyl cellulose. Such materials may include various additives such as stabilizers, dyes, foaming agents, etc., if so desired. It will be apparent that the manner by which the extruded junction and mesh-strand forming streams are set will depend upon the particular material which is being employed.

For a greater understanding of the invention, reference is made to the following detailed description and drawing in which FIG. 1 is a diagrammatic side view of the apparatus of the present invention, with a portion thereof being broken away;

FIG. 3 is a bottom view of a portion of the apparatus shown in FIGS. 1 and 2;

FIG. 4 is a horizontal section taken along the lines IV—IV of FIG 2;

FIG. 5 is a horizontal section taken along the lines V—V of FIG. 2;

FIG. 6 is a fragmentary view of one form of net-like structure formed with the apparatus of the present invention;

FIG. 7 is a view similar to FIG. 6 of another form of net-like structure; and

FIG. 8 is a fragmentary view of a portion of a modified form of apparatus.

Figure 2:
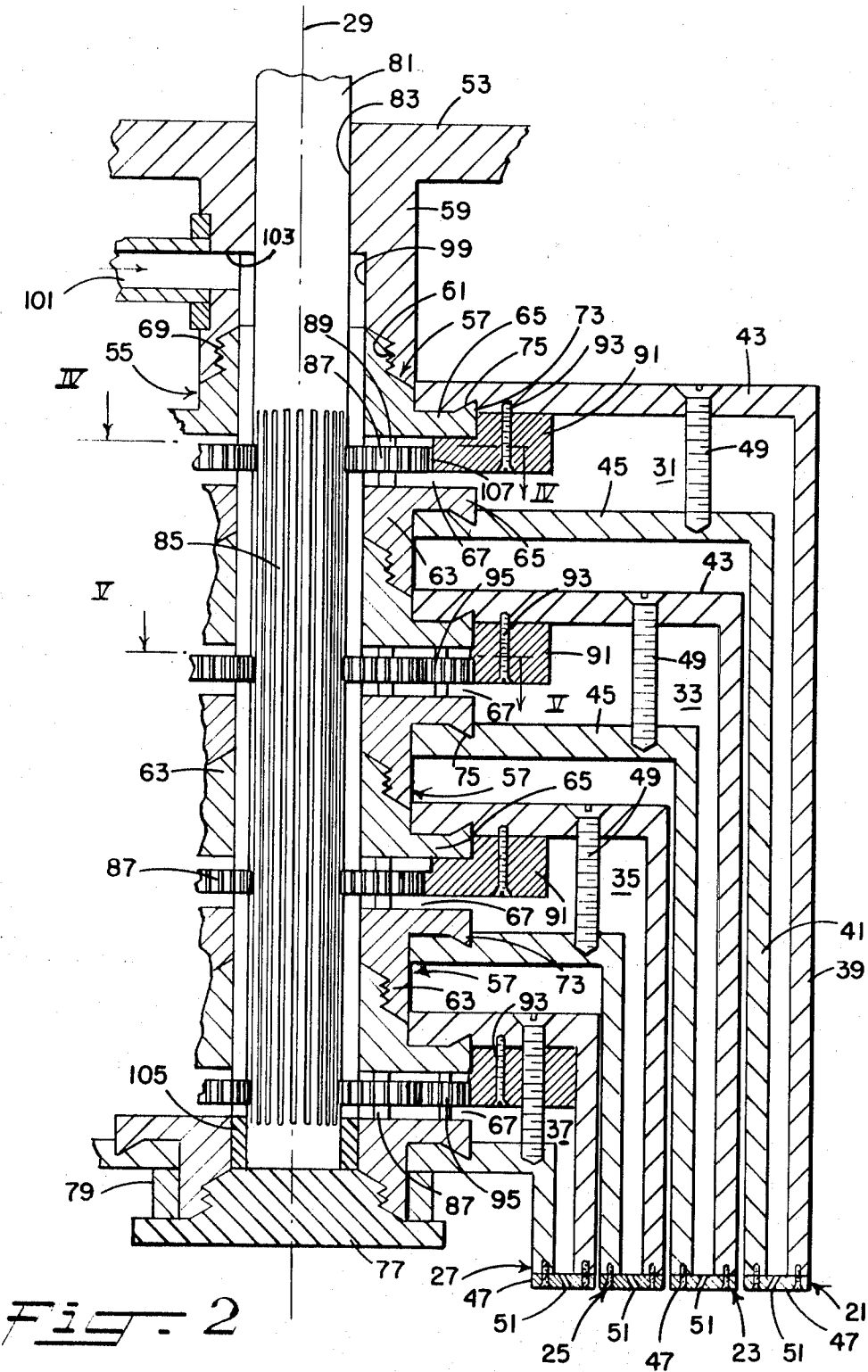
FIG. 2 is a vertical section, on an enlarged scale, of a portion of the apparatus shown in FIG. 1.

With reference to FIGS. 1 and 2 of the drawing, the preferred apparatus there illustrated includes a plurality of die-carrying members 21, 23, 25 and 27 disposed in nested or stacked relationship relative to a common axis, indicated at 29, and having chambers 31, 33, 35 and 37, respectively into which flowable strand-forming material is delivered. As shown on an enlarged scale in FIG. 2, each of the die-carrying members 21, 23, 25 and 27 includes a pair of radially spaced annular side walls 39 and 41, a pair of vertically spaced top walls 43 and 45 and a circular end wall 47 extending between and across the respective pairs of side walls 39 and 41. Desirably, the walls 43 and 45 of the respective die-carrying members are connected to each other as by screws 49.

Orifices 51 extend through the end walls 47 and open along the exposed surfaces thereof. In the apparatus shown in FIG. 2, the exposed surfaces of the individual end walls 47 are disposed along a common horizontal plane while the longitudinal axes of the orifices extend through such surfaces are inclined so that streams of flowable strand-forming material issuing from such orifices are directed along converging paths.

The die-carrying members 21, 23, 25 and 27 are supported from a fixed frame 53 by a housing 55 which is formed of a series of like segments 57. More particularly, the frame 53 includes a depending sleeve 59 which is internally threaded at 61 for connection with one of the series of segments 57. These segments resemble in appearance a pulley having a hub 63 and a pair of annular flanges 65. Each hub 63 has an internal diameter which corresponds with that of the sleeve 59 and, as shown in FIGS. 4 and 5, is formed with a series of annularly spaced, radial passages 67 which open inbetween the flanges 65. The segments 57 are provided with external threads 69 at one end thereof and internal threads 71 at their opposite ends to facilitate connection of the segments 57 to each other and to the sleeve 59. Circular ribs 73 project from the outer surfaces of the flanges 65 of each of the segments 57 and are adapted to seat snugly, yet slidably, within mating recesses 75 formed along the opposing surfaces of the walls 43 and 45 of the respective die-carrying members.

The die-carrying members 21, 23, 25 and 27 may be connected onto the respective housing segments 57 after such segments have been threaded into each other and the sleeve 59 or, alternatively and preferably, the die-carrying members may be attached to the respective segments 57 afterwhich the segments are threaded together and to the sleeve 59. While the apparatus of the present invention must include at least three die-carrying members, additional die-carrying members may be employed, depending upon such factors as the characteristics desired in the finished net-like structure and the ability to incorporate such additional die-carrying members into the apparatus in stacked or nested relationship.

As shown in FIG. 2, a plug 77 is threaded into the lowermost of the series of segments 57 to close off the lower end of the housing, and together with a spacer 79, assist in maintaining the innermost of the nested die-carrying members in desired position. During assembly, the die-carrying members are oriented so that the orifices 51 in alternate of such members are aligned radially with each other, as shown in FIG. 3.

In the embodiment illustrated in FIGS. 1–5 of the drawing, all of the die members 21, 23, 25 and 27 are simultaneously rotated about the common axis 29, with alternate of such members moving in unison and in a direction opposite to the die-carrying members adjacent thereto. Such movement is effected by a drive shaft 81, which is turned by suitable means, not shown, and extends through an opening 83 in the frame 53, the sleeve 59 and the housing 55 and terminates adjacent to the plug 77. The shaft 81 has an outside diameter which is substantially less than the inside diameters of the sleeve 59 and housing segments 57, for reasons as hereafter described, and is provided along its periphery with longitudinally extending teeth 85.

A pinion gear 87, rotatably carried by a shaft 89, is positioned positioned within at least one of the radial passages 67 of each of the housing segments 57 and meshes with the teeth 85 on the drive shaft 81. Rotation of the gears 87 is transmitted to ring gears 91, which are attached within the respective die-carrying members by screws 93. In the case of the die-carrying members 21 and 25 the gears 87 mesh directly with the ring gears 91 which are aligned therewith and thus both of such members 21 and 25 are together in the same direction. The ring gears 91 fixed to the die-carrying members 23 and 27, on the other hand, are driven by the gears 87 with which they are aligned through idler gears 95. With this arrangement the members 23 and 27 are together driven in a direction opposite to that of the members 21 and 25. As shown in FIGS. 2 and 5, the idler gears 95 are rotatably carried by shafts 97 which are disposed within the radial passages 67 of the housing segments 57 and extend between the flanges thereof.

As heretofore mentioned, the periphery of the drive shaft 81 is spaced from the inside walls of the sleeve 59 and housing segments 57 to thus provide an annular chamber 99. From a suitable source, not shown, flowable strand-forming material is continuously delivered under pressure into the chamber 99 through a conduit 101 which passes through an opening 103 in the sleeve 59. Flowing through the radial passages 67 in the housing segments 57, the strand-forming material enters into and fills the respective die-carrying members 21, 23, 25 and 27 and issues from the orifices 51 thereof as streams. A seal 105 may be provided at the lower end of the chamber 99 and openings 107 may be formed in the ring gears 91 to minimize areas at which strand-forming material collect and remain stagnant.

The streams of strand-forming material issuing from radially aligned orifices 51 will contact with each other along their lengths to provide, when set, a composite strand as shown at 109 and 111 in FIG. 6. Since the die-carrying members 21 and 25 are rotated in a direction opposite to the die-carrying members 23 and 27 during such extrusion adjacent streams will intersect with each other to provide, when set, a junction as shown at 113 in FIG. 6. Setting of the extruded streams of flowable strand-forming material may be achieved by any convenient means, as by air cooling in the case of molten strand-forming material, and is effected only after the streams have made their desired contact.

Conventional take-up means, not shown, are employed for collecting the finished net-like structure and serve to advance all of the extruded streams away from their respective orifices. If desired, a ring 115 may be positioned to engage with at least some of the extruded streams after their surfaces have been set to encourage or provide for the desired contact between the streams. In lieu of the ring 115, a ring or mandrel may be located within the circles of extruded streams to perform a like function.

In the finished net-like structures shown in FIG. 6 the composite strands 109 and 11 are interlocked and bonded to each other at the junctions 113, at which one half of each composite strand passes through the other thereof. In the event the apparatus described is employed with only three die-carrying members, a structure as shown in FIG. 7 will be provided in which strands 117, formed of unitary extruded streams pass through and are bonded to composite strands 119 at each location of intersection thereof.

If desired, die-carrying members may be of conical configuration, as shown at 121, 123, 125 and 127 in FIG. 8. Such die-carrying members would be nested together as illustrated and would be operated in substantially the same manner as the die-carrying members 21, 23, 25 and 27 shown in FIGS. 1–5.

I Claim:

1. Apparatus for continuously extruding a net-like structure including die-carrying members having orifices for extruding a plurality of streams of flowable strand-forming material at spaced intervals along each of at least three lines with the individual orifices in alternate of said die-carrying members each being aligned with a separate orifice in a die-carrying member which is located in alternating relationship therewith, the axes of the orifices which are aligned with each other being disposed along converging paths to cause streams of flowable strand-forming material issuing therefrom to merge and together form a unitary stream, means for relatively moving adjacent die-carrying members while maintaining substantially constant the aligned and axial relationships of the orifices in the alternate of said die-carrying members to intermittently interrupt the mergence of streams issuing from aligned orifices in alternate of said die-carrying members by streams issuing from orifices of a die-carrying member located between such alternate die-carrying members, means for advancing all of the extruded streams in a direction away from the extruding means, and means for setting the extruded streams to provide an integral net-like structure.

2. Apparatus as defined in claim 1 wherein said die members each include a chamber defined by a circular end wall having an exposed surface and a pair of spaced side walls, said die members being disposed in nested relationship along a common central axis with the circular walls thereof located in generally adjacent relationship to each other, said orifices extending through said circular end walls and opening along the exposed surfaces thereof, and means for delivering flowable strand-forming material under pressure into each of said chambers.

3. Apparatus as defined in claim 1 wherein said means for relatively moving adjacent die-carrying members includes means for moving all of said members with the alternate of said members moving in unison and in a direction opposite to the die members directly adjacent thereto.

4. Apparatus as defined in claim 1 wherein said means for relatively moving adjacent die-carrying members includes means for moving all of said members in the same direction with alternate die-carrying members being moved in unison and at a rate of speed which differs from that of a die-carrying member therebetween.

5. Apparatus as defined in claim 2 further including means for urging the streams in the alternate circles into contact with each other and the streams in the circles therebetween, said means including a ring fixed in spaced relationship with the die-carrying members and having its center located along the common axis, said ring having an internal radius which is smaller than the die-carrying member of largest radius.

* * * * *

UNITED STATES PATENT OFFICE
CERTIFICATE OF CORRECTION

Patent No. 3,654,031    Dated April 4, 1972

Inventor(s)   Theodore H. Fairbanks

It is certified that error appears in the above-identified patent and that said Letters Patent are hereby corrected as shown below:

In the title, both instances, "STAND" should read --STRAND--. Col. 1, line 23, after "process" insert --and apparatus--; line 35, after "improved" delete "and". Col. 4, line 34, delete "positioned". Col. 5, line 11, "11" should read --111--.

Signed and sealed this 22nd day of August 1972.

(SEAL)
Attest:

EDWARD M.FLETCHER,JR.
Attesting Officer

ROBERT GOTTSCHALK
Commissioner of Patents